REGENERATIVE REPEATER FOR BITERNARY CODED ELECTRIC PULSES

Filed May 26, 1965 3 Sheets-Sheet 1

June 25, 1968 C. HANNIGSBERG 3,390,283

REGENERATIVE REPEATER FOR BITERNARY CODED ELECTRIC PULSES

Filed May 26, 1965 3 Sheets-Sheet 3

United States Patent Office
3,390,283
Patented June 25, 1968

3,390,283

REGENERATIVE REPEATER FOR BITERNARY CODED ELECTRIC PULSES

Claude Hannigsberg, Vernouillet, France, assignor to Lignes Telegraphiques & Telephoniques, Paris, France Filed May 26, 1965, Ser. No. 458,975
Claims priority, application France, June 26, 1964, 979,760
12 Claims. (Cl. 307—268)

ABSTRACT OF THE DISCLOSURE

A regenerative repeater for biternary coded electric pulses, comprising a time differentiator circuit delivering differentiated signals of opposite phases to a first and a second channel, respectively, in each of which the latter signals are regenerated with the aid of oscillations delivered by a local oscillator. A bistable circuit provided in each channel is operated by the regenerated signals from both of said channels, and the outputs of both bistable circuits are combined to form the output signals of the repeater.

The present invention relates to a new type of regenerative pulse repeater, capable of restoring an intelligence signal consisting of a succession of rhythmic coded electric pulses, each originally having a constant duration and a rectangular waveshape, its correct waveshape and timing when said signal has been altered by its transmission through a communication circuit.

More specifically, the invention relates to a device applicable to signals coded according to a biternary code, i.e., a code in which each elementary pulse may have one of three different signalling conditions, conventionally represented by the values +1, 0 and −1, and in which an arbitrary number of successive pulses may have the same value, but in which two pulses of respective values +1 and −1 are always separated by at least one zero pulse.

It is known that such biternary coded signals may be obtained from a unipolar binary coded signal by adding thereto the latter signal itself after shifting it in time by half the duration of an elementary pulse and inverting its polarity. It is also known that an advantage of the substitution of such biternary coded signals for the original binary coded signals resides in that a larger number of elementary information units (bits) can be transmitted per unit time in a given frequency band. This advantage is all the more important that the frequency bandwidth of the transmission channel is the narrower in comparison with the recurrence frequency of the pulses to be transmitted, for instance when it is desired to transmit very short pulses, with a duration of the order of magnitude of one-half microsecond, over a telephone cable circuit, the frequency passband of which is intrinsically a limited one.

Transistorized pulse code repeaters have been previously described, for instance in a paper by Gordon A. Partridge, published in the U.S. review "Communication and Electronics," No. 46, January 1960, pages 826 to 830. In the latter paper an apparatus is described which not only effects reshaping of the pulses, but also puts them back into their correct time position with respect to the general time base of the transmission system, when this position, and more especially that of the front edge of said pulses, has been altered by disturbances occurring in the propagation of the signals. "Retiming" is effected with the aid of an "AND" gate controlled by a synchronized local oscillator.

It has been proposed to effect regeneration of bipolar pulses by dividing them into two series of unidirectional pulses of opposite polarities which are subsequently regenerated in distinct channels, the outputs of which are combined to restore the original pulses. A device for this purpose is described, for instance, in the Belgian Patent Ser. No. 567,969. This device comprises arrangements for pulse reshaping, the latter being effected with the aid of a time differentiator circuit followed by a rectifier by means of which short pulses of a given polarity are derived from the more or less distorted front edges of the received pulses, while the rear edges are treated in the same way in a second and similar circuit. The so obtained short pulses are caused to control bistable circuits, the outputs of which are combined into the restored pulses. In other words, the signals are restituted from their positive-to-negative or negative-to-positive transitions, the time positions of which are determined from the maximum negative or positive amplitudes of the time-differentiated signals. No ambiguity results from the substitution of the differentiated signal for the original one, since in the case of the ordinary binary code a positive transition always leads to a positive signal and a negative transition to a negative one.

On the contrary, in the case of the biternary code, some ambiguity may result from the fact that a positive transition, for instance, may as well represent the passage from a zero signal to a positive one as that from a negative to a zero signal. To obviate this drawback, it is necessary to take in account the signalling condition that prevails in the system prior to the considered transition.

An essential feature of the invention resides in its improved performance in this respect, such improvement resulting from the fact that, although signals of different polarities are restored in separate channels, the signal ultimately delivered at the output of each one of said channels is made to depend on all of the transitions.

The device of the present invention makes use of an original combination of the above-mentioned elements—differentiator circuits, bistable circuits and synchronized oscillator—in a manner more particularly adapted to biternary coded signals. More precisely, the device of the invention makes it possible to retime and reshape signals of either polarity, notwithstanding the fact that in the biternary code—contrary to what is the case in the bipolar binary code—signals of opposite polarities are always separated in time by a zero signal. Moreover, when the duration of a signal of constant polarity equals several units (i.e., several times the duration of an elementary pulse), this signal is restored as a whole from its front and rear edges, and not as it is done in some known systems as a succession of elementary pulses, each of which has to be restored individually.

According to the present inventon, there is provided a waveshaping and synchronization system for signals consisting of a succession of bipolar pulses of constant duration coded according to biternary code, comprising a time differentiator circuit at the input of which said signals are applied, means for deriving from the output of said first differentiator circuit first and second differentiated signals having opposite phases, first circuit means for respectively applying said first and second derived signals to a first and a second transmission channel, a second circuit means in each one of said channels for modifying the waveshape of each one of said first and second derived signals so as to derived therefrom short pulses of a single polarity, at least one local oscillator having its frequency synchronized by said short pulses, phase selector means in each one of said channels for superimposing said short pulses upon oscillations delivered by said oscillator or oscillators so as to derive from said short pulses and oscillations further pulses having a definite phase position with respect to said oscillations, a bistable circuit in each one of said channels having its state controlled on one hand by said further pulses from said phase selector means included in said one of said channels and on the other hand through further circuit means by the further pulses from said phase selector means included in the other one of said channels, and coupling means for applying output voltages delivered by both said bistable circuits to a utilization circuit.

According to a preferred embodiment of the invention, a single oscillator is used and is synchronized by the whole of said short pulses of both said channels.

Also according to a preferred embodiment of the invention, said further circuit means comprise two coincidence gates each having first and second control inputs and an output, and each one of said bistable circuits is provided with first and second control inputs, the first of which is controlled by said further pulses from that of said phase selector means which pertains to the same one of said channels as latter said bistable circuit, and the second of which is controlled by the output of one of said coincidence gates, the controlled inputs of which are respectively controlled by the further pulses from the phase selector means and the output voltage from the bistable circuit which pertain to the other one of said channels Other particulars and advantages of the invention will appear from the hereinafter given detailed description of an example of its embodiment, made with reference to the appended drawings, in which:

Figure 1:
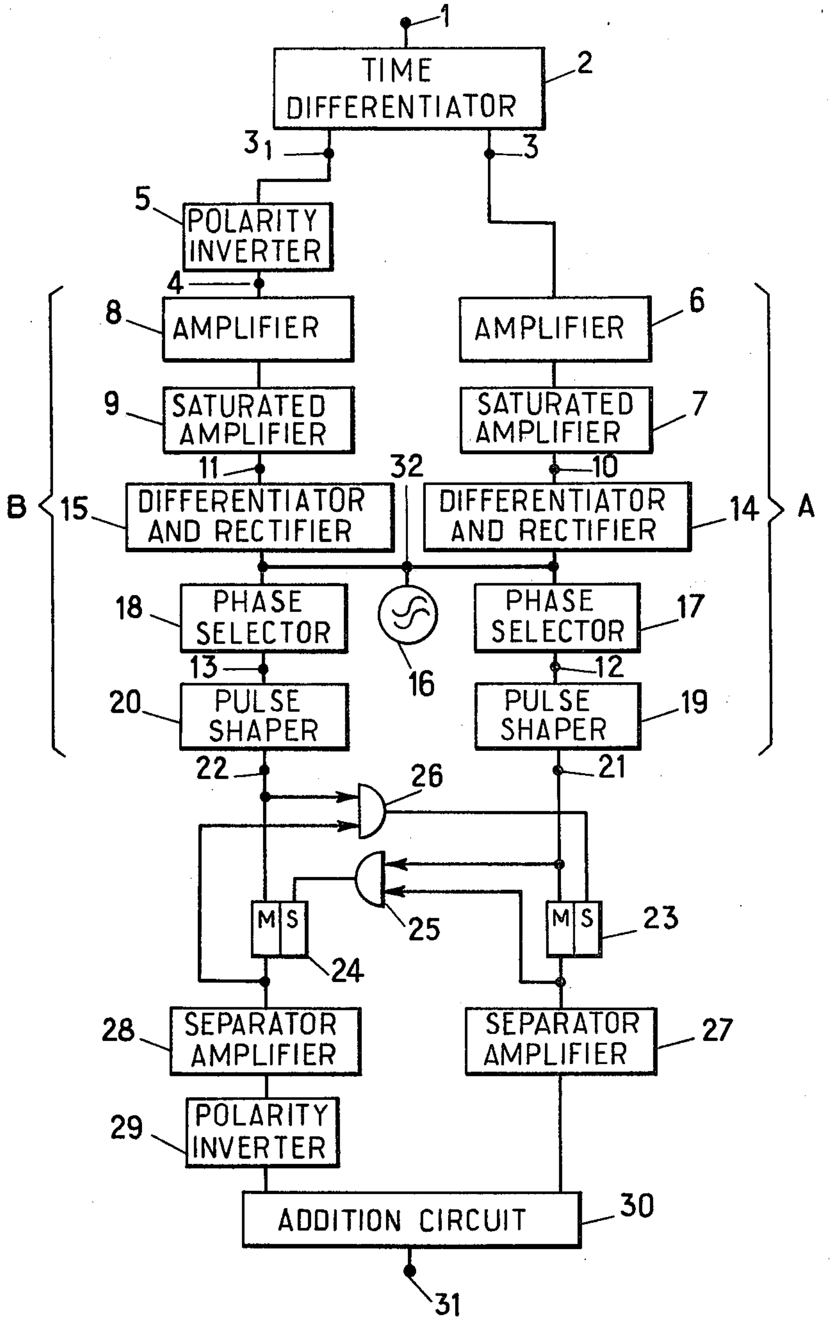
FIG. 1 shows in block diagram form the general arrangement of the device of the invention.
Figure 2:
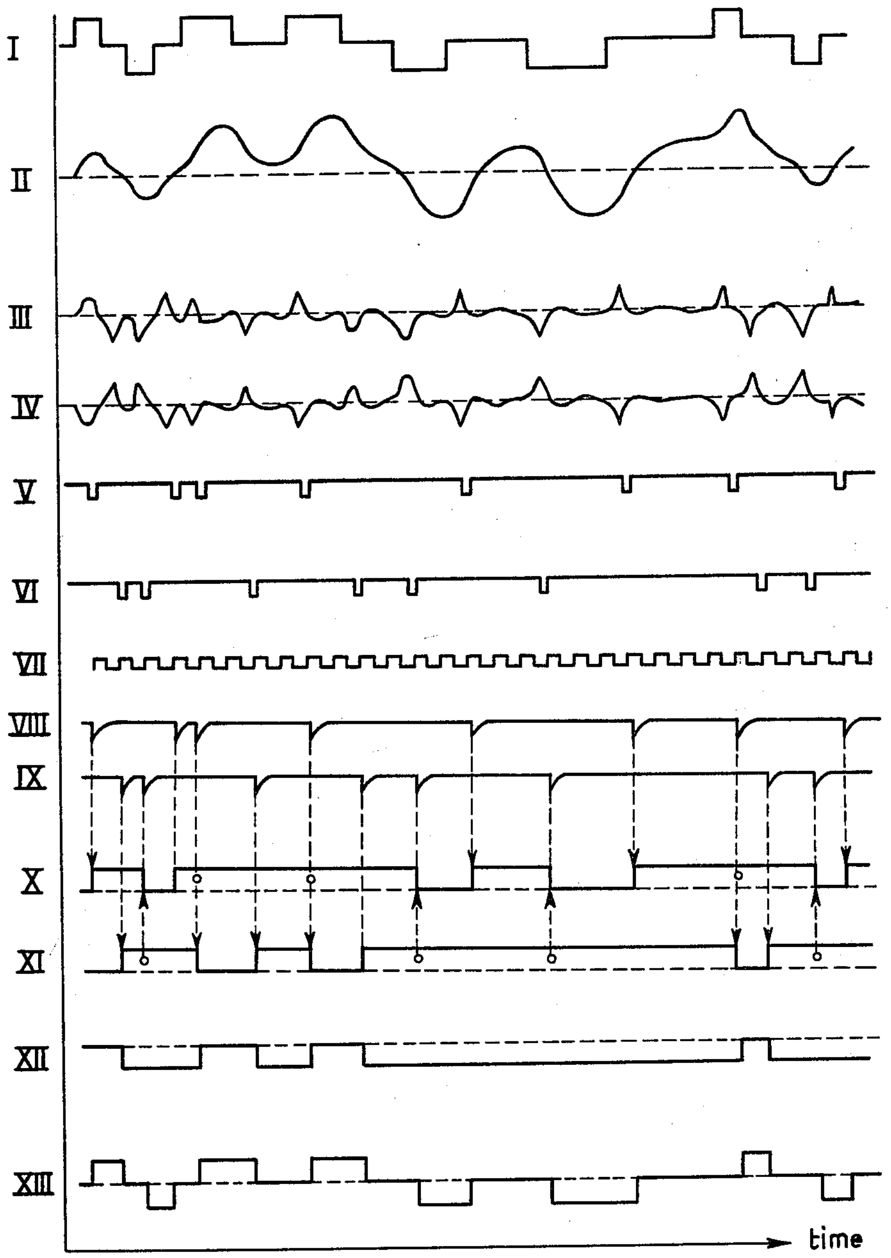
FIG. 2 shows the waveshape of the signals at various points of the device of FIG. 1.

Referring first to FIG. 1, more or less distorted coded pulses are received at terminal 1; their waveshape is shown at II in FIG. 2, while the undistorted waveshape is shown at I in FIG. 2.

The undistorted signal consists of an electric voltage, the level of which at any instant has one of the three possible values +1, 0 and −1, and the duration for which the signal remains at any one of these levels is always an integer multiple of a constant elementary duration $\tau$. The signal voltage cannot jump from the +1 to the −1 level (or conversely), without remaining at the zero level for a time at least equal to the elementary duration $\tau$.

Terminal 1 (FIG. 1) is the input terminal to a time differentiating circuit 2, which may consist, for instance, of a loosely coupled transformer, to the primary winding of which the incoming signal voltage is applied, and the secondary winding of which is tuned by means of a suitably mentioned capacitor to a frequency in the vicinity of half the pulse recurrence frequency $1/\tau$. The so constituted resonant circuit is suitably damped by a series resistor, to avoid persistent free oscillation. From the secondary winding of the transformer, a voltage proportional to the time derivative of the voltage applied to 1 is obtained and appears at terminal 3 of FIG. 1. Its waveshape is shown at III (FIG. 2).

The next step of the process is that of deriving from the differentiated voltage two further voltages proportional thereto and having equal amplitude but opposite phases, as shown at III and IV, respectively, in FIG. 2. This can be done by various methods.

In a first method, the secondary winding of the abovementioned transformer may be provided with a grounded mid-point and two equal voltages having opposite phases may be obtained from the ends of this secondary winding.

Alternatively, in the arrangement of FIG. 1, identical time differentiated voltages are assumed to appear at terminals 3 and $\mathbf{3_1}$ of circuit 2, and the voltage received at $\mathbf{3_1}$ passes through a polarity inverter 5, at the output 4 of which a phase-inverted voltage having the waveshape shown at IV (FIG. 2) is delivered. The polarity inverter may simply consist of an ordinary transistor amplifier stage in common emitter connection. Of course, many other forms of time differentiator and phase inverter circuits might be employed. Whatever be the type of circuit selected, it must be borne in mind that, in the device of FIG. 1, two time differentiated voltages having equal instantaneous amplitudes and opposite polarities, such as shown at III and IV in FIG. 2, respectively appear at terminals 3 and 4 in FIG. 1.

The signal which appears at terminal 3 (FIG. 1) is subsequently applied to a first transmission channel A (FIG. 1) and the signal which appears at terminal 4 is similarly applied to a second transmission channel B (FIG. 1).

Channel A comprises, for instance, a first amplifier 6, which may be an ordinary transistor stage in common emitter connection, followed by a non-linear amplifier 7, here described as a "saturated" amplifier, the function of which is to alter in a predetermined manner the waveshape of the signal delivered at the output of 6. Amplifier 7 may consist, for instance, of a transistor stage with a grounded emitter and between the base and emitter electrodes of which a suitably biased tunnel diode is connected. Assuming the transistor to be of the p-n-p type, and the bias applied to the tunnel diode to bring the latter to the high impedance condition, so as to give the base of the transistor a strong bias and to bring its collector current to the saturation condition, a positive signal voltage appearing across the tunnel diode causes the latter to suddenly pass to the low impedance condition and the collector current of the transistor to decrease in a very abrupt manner. Consequently, at the output 10 of amplifier 7, which is taken at the collector electrode of the transistor, there appears a waveshape more or less similar to that of the positive parts of III of FIG. 2, but phase-inverted and much steeper in its negative slope parts.

In a similar manner, the signal appearing at terminal $\mathbf{3_1}$ (FIG. 1) with the waveshape shown at IV in FIG. 2 is transmitted in the second channel B (FIG. 1) after having been phase-inverted in the polarity inverter 5, to an amplifier 8 and a saturated amplifier 9. Consequently, at the output 11 of the saturated amplifier 9 of FIG. 1, there appears a signal whose steep negative slopes correspond in time to the negative parts of curve IV of FIG. 2.

Further time differentiation and rectification of the signals delivered at 10 and 11 (FIG. 1), in the differentiator and rectifier circuits 14 and 15, respectively, lead to the signals shown at V and VI (FIG. 2), each of which consists of a succession of a short duration negative pulses appearing at instants corresponding to the maximum positive (or negative) amplitudes of curve III (or of curve IV) of FIG. 2. These short duration pulses occur at instants approximately corresponding to the level transition instants in curve I of FIG. 2 which, as already mentioned, represents the undistorted initial signal. However, as it is well known, the time correspondence is only an approximate one; time selection must be applied to the signals of curves V and VI and "jitter" eliminated before fully restored signals as to both waveshape and timing can be derived from them. This is the purpose of the phase selector means shown at 17 and 18 (FIG. 1), the operation of which will now be explained.

Signals issuing from 14 and 15 are respectively applied at point 32 to the inputs of two phase selectors 17 and 18, together with oscillations delivered by a local oscillator 16, synchronized by the whole of the short pulses delivered by 14 and 15. Oscillator 16 may be of any known type, but a preferred embodiment is described later on in connection with FIG. 3. Whatever be the type selected for oscillator 16, it oscillates at a frequency equal to $1/\tau$ when synchronized and delivers an approximately rectangular waveshape signal, shown at VII in FIG. 2.

The phase selector 17 operates as a time selection gate, the function of which is to allow only those pulses from 14 received at 32 which have the proper phase with respect to the wave delivered by oscillator 16 to reach the output 12 of 17. A preferred embodiment of phase selector 17 will be described later on, in connection with FIG. 3.

The short pulses which appear at the output 12 of 17 and, similarly, those which appear at the output 13 of 18, now have correct timing and may be used to control the subsequent elements of channels A and B, respectively. However, before their being applied to the control inputs of bistable circuits 23 and 24 which will restore the original waveform as shown at I in FIG. 2, the synchronized pulses from 17 and 18 will still be modified in the pulse shapers 19 and 20, respectively, whose function is to further increase the steepness of their front edges. Pulse shapers 19 and 20 may be built in any known form adapted to such a purpose, for instance in the same form as the saturated amplifiers 7 and 9, such amplifiers being followed by a conventional time differentiator circuit consisting of a low-capacity series capacitor and a shunt resistor.

The waveshapes of the signals received at the outputs 21 and 22 of 19 and 20 are shown at VIII and IX, respectively, in FIG. 2. The latter signals consist of very short negative pulses, correctly timed with respect to the general time basis of the system, but occurring at different times for one and the other of channels A and B and respectively corresponding to the positive and negative transitions of the undistorted original signal shown at I in FIG. 2.

Before describing the manner in which the signals received at 21 and 22 will control the bistable circuits 23 and 24 (FIG. 1) which will ultimately supply restored signals with the proper waveshape, a preferred and very simple embodiment of the differentiator, rectifier and phase selector circuits 14 and 17 of FIG. 1, as well as of the synchronized oscillator 16, will be shortly described.

Figure 3:
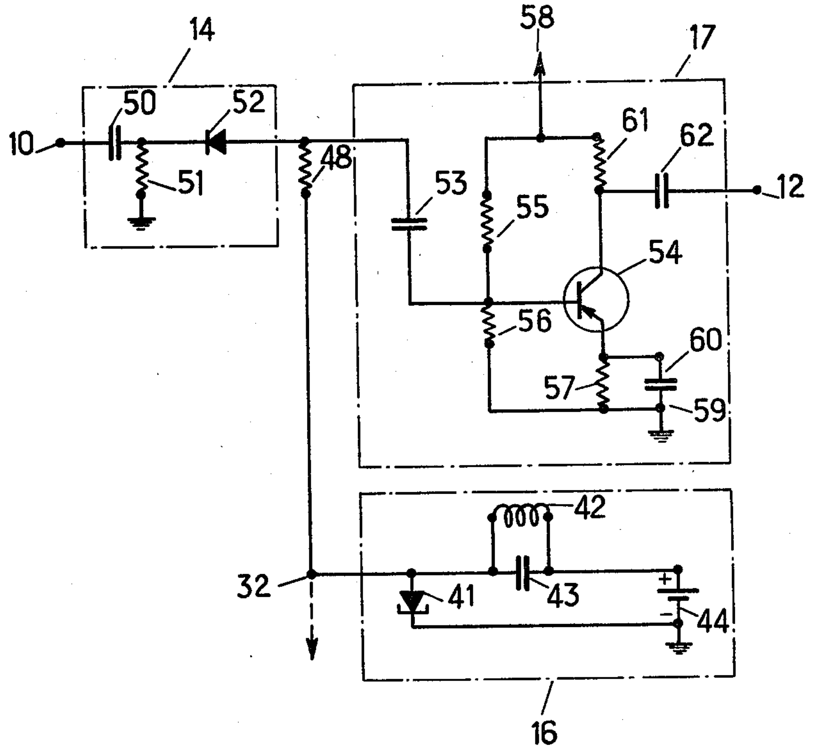
FIG. 3 shows the arrangement of a synchronized oscillator and phase selector means employed in the arrangement of FIG. 1.

Referring now to FIG. 3, the latter shows the arrangement of the differentiator and rectifier circuit 14, which simply consists of a low-capacity capacitor 50, a resistor 51 and a rectifier 52. Differentiated and rectified signals from 14 are applied at 32 to the oscillator 16, together with similar signals from 15 (FIG. 1). Oscillator 16 (FIG. 3) consists of a parallel capacitor-and-inductance tuned circuit 42, 43 and a tunnel diode 41 so biased from a direct-current source 44 as to operate in a negative resistance condition ensuring continuous oscillation. Oscillator 16, the tuned circuit (42, 43) of which is comparatively highly damped, is easily synchronized to the average recurrence frequency of the signals received from 14 and 15. The oscillations from 16, together with the signals from 14, are applied to the phase selector 17. The latter consists of a transistor amplifying stage including transistor 54, the emitter bias resistor 57 grounded at 59 and in parallel connection with the bypass capacitor 60 for the alternating currents, the base electrode bias resistors 55, 56, the collector load resistor 61, and the capacitor 62 linking the collector electrode to the output terminal 12. The bias currents are supplied by a direct-current source (not shown) connected between 58 and 59.

The oscillations from 16, transmitted from point 32 through resistor 48 and capacitor 53, cause the base electrode of 54 to automatically assume such a bias potential that current can only flow in the collector circuit during the half-period of the oscillations in which said oscillations have the proper polarity. Consequently, pulses received from 14 through rectifier 52 and capacitor 53 can only cause a current to flow through 61 and a pulse to be transmitted to terminal 12 when said pulses occur during the proper half-period of the oscillations delivered by 16. Thus, a time selection is realized for the pulses from 14, and pulses occurring during the other half-period are suppressed.

The same, of course, holds good for the elements 15 and 18 of FIG. 1, which play the same part in channel B as 14 and 17 do in channel A.

Reverting now to FIG. 1, the phase-selected pulses from 17 and 18 are respectively applied to the pulse shapers 19 and 20. The function of the latter is that of increasing the steepness of the front edges of said pulses. Pulse shapers 19 and 20 may be of any known description; for instance, they may be built in the same manner as the already described saturated amplifiers 7 and 9.

From the correctly timed pulses shown at VIII and IX (FIG. 2), the device of FIG. 1 must now reconstitute the original signals, the waveshape of which is shown at I (FIG. 2), with their proper polarity, duration and timing. This is effected by causing the steep front-edged pulses received at points 21 and 22 of FIG. 1 to control the bistable circuits 23 and 24; more precisely, by causing each of said bistable circuits to be controlled by both signals received at 21 and 22, in a manner that will now be described in greater detail.

For this purpose, as it will be seen in FIG. 1, each of the bistable circuits 23 and 24 is provided with two control inputs and one output. Taking by way of example the bistable circuit 23, its first control input is connected with the output 21 of the pulse shaper 19, which belongs to the same channel A as 23, and receives control pulses from 19. The second input of 23 recives further control pulses from the output of a coincidence gate 26, having two control inputs, the first of which receives control pulses from the output of the pulse shaper 20 pertaining to channel B, while the second input of 26 receives the voltage from the output of the bistable circuit 24 of channel B. Similarly, the control inputs of the latter bistable circuit are respectively connected with the outputs of 20 and of another coincidence gate 25, the control inputs of which respectively receive pulses from the output 21 of pulse shaper 19 and the voltage from the output of the first-mentioned bistable circuit 23.

Each of the bistable circuits 23 and 24 has two inputs and two possible states, the "mark" state M, for which it delivers at its output a (+1) voltage, and the "space" state S, for which it delivers at its output a zero voltage. Points 21 and 22 are directly connected with the M inputs of 23 and 24, respectively. A pulse from 21 in channel A causes the bistable circuit 23 to trigger to its M (+1) state if 23 was previously in the S state, or has no effect if 23 already was in the M state. Similarly a pulse from 22 in channel B causes the bistable circuit 24 to trigger to its M (+1) state if it was in the S state, or has no effect if it already was in the M state. In the addition circuit 30 of FIGURE 1, the voltages appearing at the outputs of 23 and 24 are additively combined after that from 24 has had its polarity inverted, the M state of 24 thus corresponding to the delivery of a (−1) voltage to the output terminal 31 of the whole system and to any utilization circuit connected thereto. The means by which the output voltages from 23 and 24 are transmitted to 30 will be explained in greater detail later on.

Essentially, the arrangement (23, 24, 25, 26) has for its purpose that of making any pulse appearing at 21 to cause a (+1) voltage transition to occur at 31 and, symmetrically, any pulse appearing at 22 to cause a reverse (−1) voltage transition to occur at 31. Consequently, two successive pulses appearing at 21 will unconditionally cause a (+1) voltage to appear at 31, and similarly, two successive pulses appearing at 22 will unconditionally cause a (−1) voltage to appear at 31. Since, except for the zero voltage condition, there is no other possible condition which can prevail at the output 31 of the system, no ambiguity can persist in the correspondence between the signal received at 31 and the original signal, as soon as two such successive pulses have been received at either of terminals 21 and 22.

The operation of the assembly (23, 24, 25, 26) is as follows:

If the bistable circuit 23 already is in the M state when a pulse is received from 21, no change occurs in 23, but the +1 voltage from the output of 23 is applied to one of the inputs of the coincidence gate 25 and thus allows the other input of 25, which is connected to 21, to transmit the pulse from 21 to the S input of the bistable circuit 24, which brings the latter to the S state. On the contrary, when a pulse from 21 causes the bistable circuit 23 to pass from the S to the M state, no change occurs in the other bistable circuit 24.

Similarly, a pulse from 22 causes no change in 24 if the latter already is in the M state, but the output voltage from 24, which is applied to one of the inputs of the coincidence gate 26, allows the pulse from 22 applied to the other input to 26 to be transmitted to the S input of the bistable circuit 23 which thus passes to the S condition. On the contrary, if the bistable circuit 24 is in the S state when a pulse from 22 reaches its M input, no change occurs in the other bistable circuit.

In the diagram of FIG. 1 there may still be seen three further elements, the separator amplifiers 27 and 28 and the polarity inverter 29. The function of the two former is only that of "buffer" stages, having a high input impedance and a low output impedance. They may be built, for instance, in the form of conventional emitter follower transistor amplifier stages. The polarity inverter has for its function that of transforming the (+1) voltage from the output of 28 into a (−1) voltage before the latter be applied to the addition circuit 30, since the outputs of the identically built bistable circuits 23 and 24 both deliver (+1) voltages.

The above-described arrangements allow the restored signals shown at X and XI (FIG. 2) to be reconstituted from the short duration pulse series VIII and IX received at 21 and 22 (FIG. 1). In FIG. 2, the small circles in the time diagrams X and XI indicate the cases where the change in the state of one or the other of circuits 23 or 24 (FIG. 1) is effected through the coincidence gate associated with the other of these bistable circuits. The signal X (FIG. 2) is the signal received at the output of 27 (FIG. 1); similarly, the signal XI (FIG. 2) is the signal received from 28 (FIG. 1), which becomes the signal XII after it has been polarity-inverted in 29. The resultant signal at 31 (FIG. 1) is shown at XIII (FIG. 2) and is to a very high degree of accuracy similar to the undistorted original signal shown at I.

What is claimed is:

1. A regenerative repeater for signals consisting of a succession of bipolar pulses of constant duration coded according to a biternary code, comprising a time differentiator circuit at the input of which said signals are applied, first circuit means for deriving from the output of said first differentiator circuit first and second differentiated signals having opposite phases and for respectively applying said first and second derived signals to a first and a second transmission channel, second circuit means in each one of said channels for modifying the waveshape of said first and second derived signals so as to derive therefrom short pulses of a single polarity, a local oscillator having its frequency synchronized by said short pulses, phase selector means in each one of said channels for superimposing said short pulses upon oscillations delivered by said oscillator so as to derive from said short pulses and oscillations further pulses having a definite phase position with respect to said oscillations, a bistable circuit in each one of said channels having its state controlled by said further pulses from both of said phase selector means included in both of said channels, and coupling means for applying output voltages delivered by both said bistable circuits to a utilization circuit.

2. A regenerative repeater for signals consisting of a succession of bipolar pulses of constant duration coded according to a biternary code, comprising a time differentiator circuit at the input of which said signals are applied, first circuit means for deriving from the output of said first differentiator circuit first and second differentiated signals having opposite phases and for respectively applying said first and second derived signals to a first and a second transmission channel, second circuit means in each one of said channels for modifying the waveshape of said first and second derived signals so as to derive therefrom short pulses of a single polarity, a local oscillator having its frequency synchronized by said short pulses, phase selector means in each one of said channels for superimposing said short pulses upon oscillations delivered by said oscillator so as to derive from said short pulses and oscillations further pulses having a definite phase position with respect to said oscillations, a bistable circuit in each one of said channels having its state controlled through further circuit means by said further pulses from both of said phaseselector means included in both of said channels, and coupling means for applying output voltages delivery by both said bistable circuits to a utilization circuit; said further circuit means comprising two coincidence gates each having first and second control inputs and an output, and each of one said bistable circuits in one of said channels being provided with first and second control inputs, the first of which is controlled by said further pulses from that of said phase selector means which pertains to the same one of said channels as latter said bistable circuit, and the second of which is controlled by the output of one of said coincidence gates, the control inputs of which are respectively controlled by the further pulses from the phase selector means and the output voltage from the bistable circuit which pertain to the other one of said channels.

3. A regenerative repeater as claimed in claim 1, in which a single oscillator is used and is synchronized by the whole of said short pulses of both said channels.

4. A regenerative repeater as claimed in claim 3, in which said oscillator comprises a tunnel diode and a tuned circuit consisting of an inductance and a capacitor in parallel connection.

5. A regenerative repeater as claimed in claim 1, in which said oscillator is tuned to a frequency substantially equal to the reciprocal of said constant duration.

6. A regenerative repeater as claimed in claim 1, in which said coupling means include an addition circuit.

7. A regenerative repeater as claimed in claim 6, in which said coupling means include a first and a second separator amplifier having their input respectively fed from the outputs of said bistable circuits, and in which the output of said first separator amplifier is directly connected to said addition circuit while the output of said second separator amplifier is connected to said addition circuit through a polarity inverter.

8. A regenerative repeater as claimed in claim 1, in which said first circuit means in one of said channels include a direct connection, while in the other one of said channels said first circuit means include a polarity inverter.

9. A regenerative repeater as claimed in claim 1, in which said second circuit means include a saturated transistor amplifier.

10. A regenerative repeater as claimed in claim 9, in which said second circuit means further include a time differentiator and rectifier circuit.

11. A regenerative repeater as claimed in claim 1, in which said further pulses from said phase selector means are applied to said bistable circuits through a pulse shaper increasing the steepness of the front edges of said further pulses.

12. A regenerative reporter as claimed in claim 1, in which said phase selector means consist of an amplifier stage including a transistor in common emitter connection to the base electrode of which said oscillations and short pulses are simultaneously applied.

No references cited.

ARTHUR GAUSS, *Primary Examiner.*

S. D. MILLER, *Assistant Examiner.*